(12) United States Patent
Vanderpol et al.

(10) Patent No.: US 9,065,799 B2
(45) Date of Patent: Jun. 23, 2015

(54) METHOD AND APPARATUS FOR CYBER SECURITY

(75) Inventors: Mathew Vanderpol, Bellevue, NE (US);
Seth A. Hellbusch, Omaha, NE (US);
Robert W. Hale, Manassas, VA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 472 days.

(21) Appl. No.: 13/087,998

(22) Filed: Apr. 15, 2011

(65) Prior Publication Data
US 2012/0266230 A1    Oct. 18, 2012

(51) Int. Cl.
*H04L 29/06* (2006.01)
*G06F 21/55* (2013.01)
*G06F 21/85* (2013.01)

(52) U.S. Cl.
CPC ........ *H04L 63/0227* (2013.01); *H04L 63/1441* (2013.01); *G06F 21/552* (2013.01); *G06F 21/85* (2013.01); *G06F 2221/2101* (2013.01); *G06F 2221/2113* (2013.01)

(58) Field of Classification Search
None
See application file for complete search history.

(56) References Cited

U.S. PATENT DOCUMENTS

| | | | |
|---|---|---|---|
| 7,260,845 B2 * | 8/2007 | Kedma et al. | 726/23 |
| 7,490,350 B1 | 2/2009 | Murotake et al. | |
| 7,849,360 B2 * | 12/2010 | Largman et al. | 714/13 |
| 7,975,260 B1 * | 7/2011 | Conover | 717/127 |
| 2002/0129274 A1 * | 9/2002 | Baskey et al. | 713/201 |
| 2006/0020814 A1 * | 1/2006 | Lieblich et al. | 713/182 |
| 2008/0040790 A1 * | 2/2008 | Kuo | 726/12 |
| 2008/0134321 A1 * | 6/2008 | Rajagopal et al. | 726/21 |
| 2009/0158428 A1 | 6/2009 | Wang | |
| 2010/0050249 A1 | 2/2010 | Newman | |
| 2010/0242111 A1 | 9/2010 | Kraemer et al. | |
| 2010/0257598 A1 * | 10/2010 | Demopoulos et al. | 726/13 |

OTHER PUBLICATIONS

Liu et al., "Architectures for Self-Healing Databases under Cyber Attacks," *International Journal of Computer Science and Network Security*, vol. 6, No. 1B, Jan. 2006, pp. 204-216.

(Continued)

*Primary Examiner* — Jung Kim
*Assistant Examiner* — Tri Tran
(74) *Attorney, Agent, or Firm* — Oblon, McClelland, Maier & Neustadt, L.L.P.

(57) ABSTRACT

Aspects of the disclosure provide a network interface device for use in an electronic device. The network interface device includes multiple systems and can be configured to perform multiple levels of security functions. In an example, the network interface device includes a first system and a second system. The first system includes a first interface configured to couple the first system with a host system of the electronic device, a second interface configured to couple the first system with an external electronic device, and first integrated circuits configured to monitor and filter traffic flowing between the external electronic device and the host system of the electronic device. The second system includes second integrated circuits. The network interface device also includes a communication channel between the first system and the second system. The second system is configured to send control information to and receive status information from the first system via the communication channel.

21 Claims, 7 Drawing Sheets

(56) References Cited

OTHER PUBLICATIONS

Monteiro et al., "Integrated Systems for Collecting, Processing and Storing Network Information," 7th Conference of Telecommunications, Santa Maria de Feira, Portugal, May 3-5, 2009.

Locasto et al., "FLIPS: Hybrid Adaptive Intrusion Prevention," RAID 2005, Department of Computer Science, Columbia University, Sep. 7, 2005.

* cited by examiner

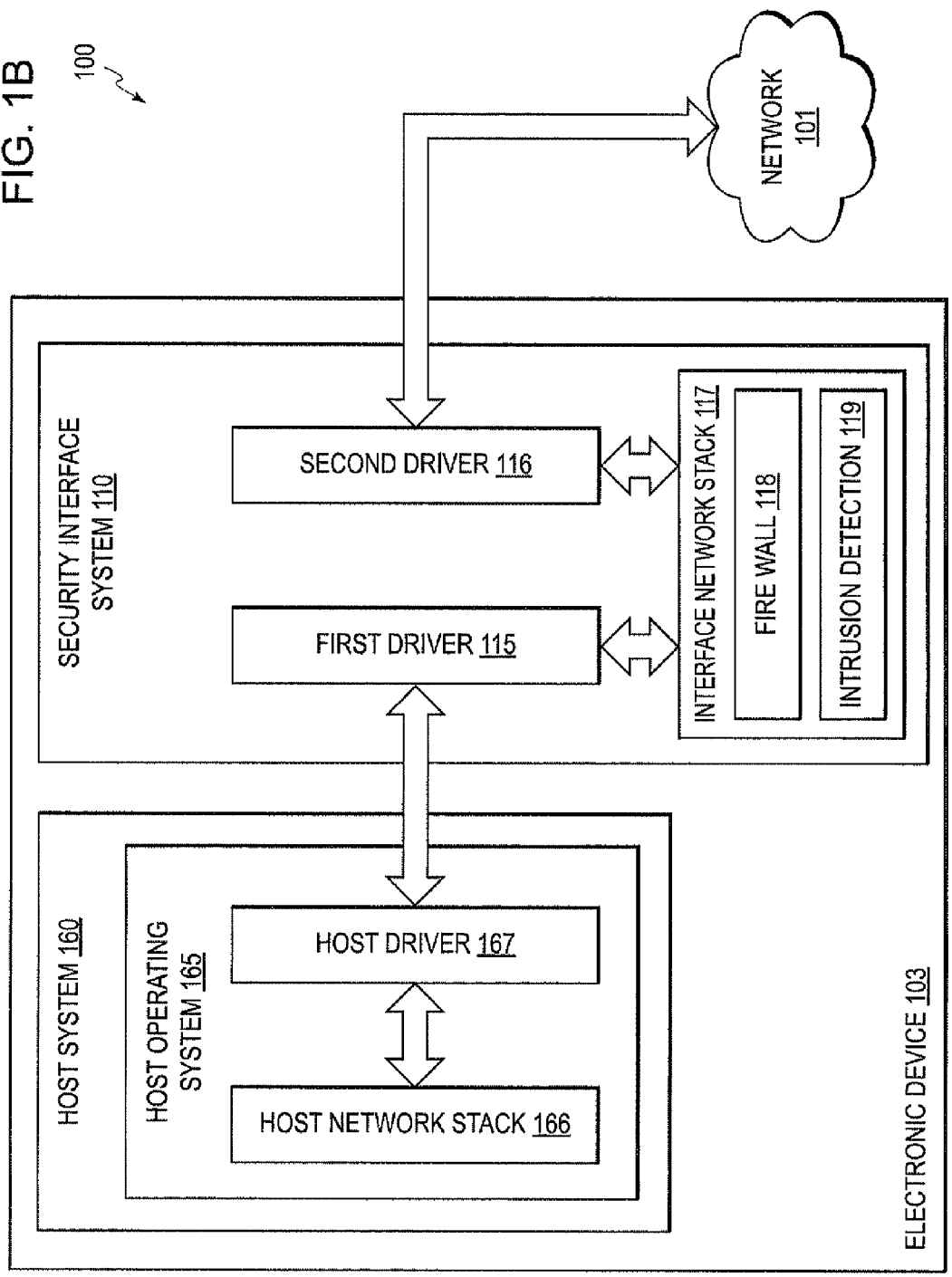

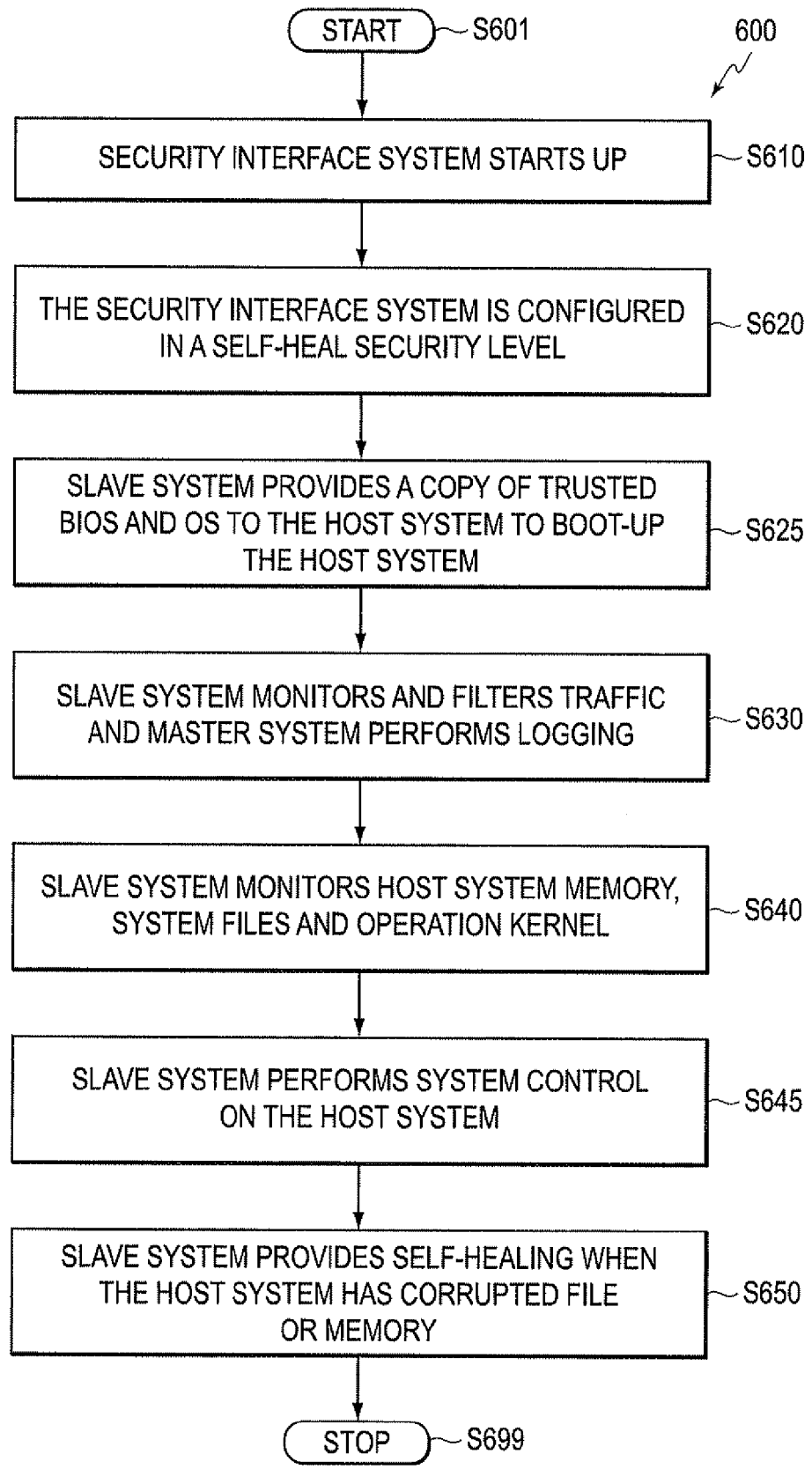

METHOD AND APPARATUS FOR CYBER SECURITY

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cyber security is a major concern in information technology. As attackers have become more sophisticated, cyber security is required to provide robust defense to protect a system from threat of attack, prevent damage to information in the system, and ensure uninterrupted and secure information service from the system.

SUMMARY

Aspects of the disclosure provide a network interface device for use in an electronic device. The network interface device includes multiple systems and can be configured to perform multiple levels of security functions. In an example, the network interface device includes a first system and a second system. The first system includes a first interface configured to couple the first system with a host system of the electronic device, a second interface configured to couple the first system with an external electronic device, and first integrated circuits configured to monitor and filter traffic flowing between the external electronic device and the host system of the electronic device. The second system includes second integrated circuits. The network interface device also includes a communication channel between the first system and the second system. The second system is configured to send control information to and receive status information from the first system via the communication channel.

Further, the first system includes a first memory configured to store a snapshot copy of at least one of a file and a memory portion in the host system. In an example, the first memory is configured to store a reference copy of the file or the memory portion in the host system, and the first integrated circuits are configured to compare the snapshot copy with the reference copy to detect file and/or system corruption in the host system. In addition, in an example, the first memory is configured to store a copy of system BIOS and operating system (OS) image for the host system, and the first integrated circuits are configured to send the copy of system BIOS and OS image to the host system when the host system boots up.

In an embodiment, the network interface device includes a shared memory configured to have a first portion configured to be accessible by both the first system and the second system, and a second portion configured to be accessible by the second system. In an example, the second portion is configured to be accessible only by the second system. The second system is configured to monitor the first portion of the shared memory that is used by the first system.

According to an aspect of the disclosure, the second system includes a second memory configured to store a copy of system files for the first system, and the second system is configured to send the copy of system files to the first system by writing to the first portion of the shared memory.

In an embodiment, the first integrated circuits include a firewall module configured to filter the traffic between the host system and the external electronic device and an intrusion detection module configured to detect intrusion based on the traffic between the host system and the external electronic device.

Further, in an embodiment, the first integrated circuits are configured to control resource and object access of the host system.

Aspects of the disclosure also provide a method for performing cyber security in an electronic device. The method includes receiving incoming traffic from an external electronic device at a first system of a network interface device in the electronic device, monitoring and filtering the incoming traffic by the first system, and forwarding the filtered incoming traffic from the first system to a host system of the electronic device. Further, the method includes receiving by the first system outgoing traffic from the host system, monitoring and filtering the outgoing traffic by the first system and forwarding the filtered outgoing traffic to the external electronic device from the first system.

BRIEF DESCRIPTION OF THE DRAWINGS

Various embodiments of this disclosure that are proposed as examples will be described in detail with reference to the following figures, wherein like numerals reference like elements, and wherein:

FIGS. 1A and 1B show block diagrams of a network system example 100 according to an embodiment of the disclosure;

FIG. 6 shows a flow chart outlining a process example 600 according to an embodiment of the disclosure.

DETAILED DESCRIPTION OF EMBODIMENTS

Figure 1A:
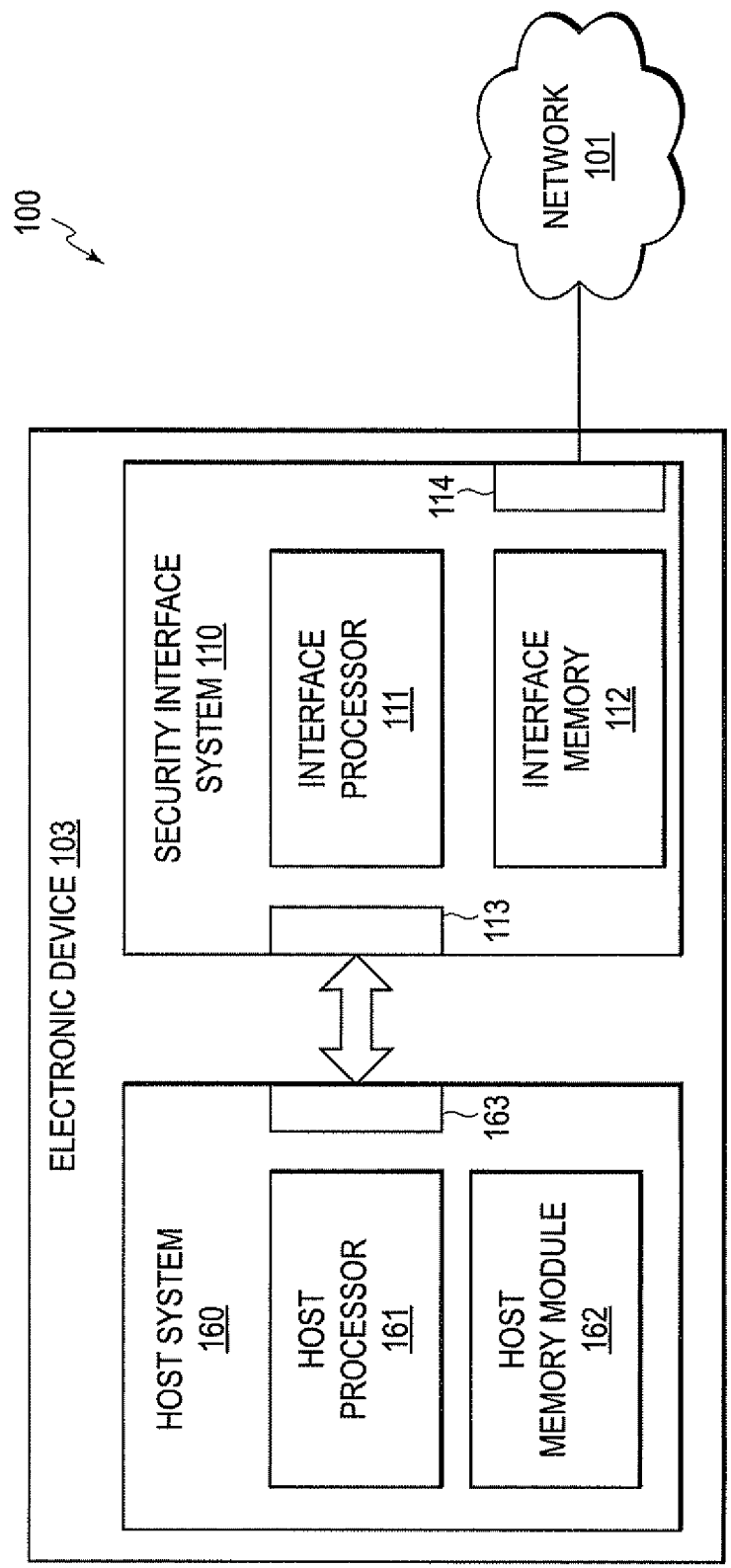

FIG. 1A shows a block diagram of a network system example 100 according to an embodiment of the disclosure. The network system 100 includes an electronic device 103 coupled to a network 101.

The network 101 may be a single network or a plurality of networks of the same or different types. For example, the network 101 may include a local telephone network in connection with a long distance telephone network. Further, the network 101 may be a data network or a telecommunications or video distribution (e.g., cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present disclosure. It is noted that the network 101 can be either wired and/or wireless network, and can be secured and/or non-secured network.

The electronic device 103 can be any suitable electronic device, such as a desktop computer, a laptop computer, a server, a router, a gateway, a switch, and the like. The electronic device 103 includes a host system 160 and a security interface system 110. The security interface system 110 interfaces the host system 160 to the network 101, and secures the host system 160 from attackers in the network 101.

The host system 160 can include any suitable hardware, firmware and/or software. In an example, the host system 160 includes a host processor 161, a host memory module 162, and a host interface 163. The host memory module 162 is configured to store instruction codes and data, and the host processor 161 is configured to execute the instruction codes stored in the host memory module 162 and process the data stored in the host memory module 162. The host memory module 162 includes, non-volatile memory, such as flash memory, hard-drive, optical disc and the like, and random access memory (RAM), such as static RAM (SRAM), dynamic RAM (DRAM) and the like. The host interface 163 is configured to enable communication between the host system 160 and the security interface system 110. It is noted that the host interface 163 can be any suitable host bus configured to enable communication with the security interface system 110. The host processor 161, the host memory module 162, the host interface 163 and any other suitable components (not shown) of the host system 160 are suitably configured according performance requirements of the host system 160.

In an embodiment, the host memory module 162 includes a rewritable non-volatile memory, such as a flash memory, and the like, to store firmware, such as system basic input/output system (BIOS), and the like, and a hard-drive to store instruction codes for an operating system (OS). Further, the host memory module 162 includes RAM that has relatively faster access speed. During operation, such as a boot-up operation, the system BIOS is loaded from the rewritable non-volatile memory into the RAM. The host processor 161 executes the system BIOS to load the instruction codes for the operating system from the hard-drive into the RAM, and executes the instruction codes to start the operating system.

According to an aspect of the disclosure, an attacker to the electronic device 103 often tries to discover security flaws in the operating system of the host system, and can use the security flaws to disable security solutions that rely on the operating system.

According to an embodiment of the disclosure, the security interface system 110 includes suitable components to perform security operations that do not rely on the operating system of the host system 160. In the FIG. 1A example, the security interface system 110 includes an interface processor 111 and an interface memory module 112, a first interface 113 and a second interface 114. The interface memory module 112 is configured to store instruction codes and data, and the interface processor 111 is configured to execute the instruction codes stored in the interface memory module 112 and process the data stored in the interface memory module 112. The interface memory module 112 includes, non-volatile memory, such as flash memory, hard-drive, optical disc and the like, and random access memory (RAM), such as static RAM (SRAM), dynamic RAM (DRAM) and the like. The first interface 113 is configured to enable communication between the host system 160 and the security interface system 110. The second interface 114 is configured to enable communication between the security interface system 110 and the network 101. The interface processor 111, the interface memory module 112, the first interface 113 and the second interface 114 are suitably configured according to performance requirements of the security interface system 110.

It is noted that the host interface 163 and the first interface 113 can include any suitable hardware and software according to any suitable protocol and standard to enable communication between the host system 160 and the security interface system 110. In an embodiment, the host interface 163 in the host system 160 includes a peripheral component interconnect express (PCI express) slot, and suitable hardware and software that support PCI express standard, and the first interface 113 in the security interface system 110 is in the form of a PCI express card, and suitable hardware and software that support PCI express standard. When the PCI express card is plugged in the PCI express slot, the host interface 163 and the first interface 113 can communicate according to the PCI express standard.

It is also noted that the second interface 114 can include any suitable hardware and software configured to enable communication with the network 101 using any suitable protocol and standard. In another embodiment, the second interface 114 includes hardware and software that support the Ethernet standard. The second interface 114 communicates with the network 101 according to the Ethernet standard.

According to an aspect of the disclosure, the security interface system 110 is configured to monitor traffic between the host system 160 and the network 101 to filter the traffic, detect intrusion to the host system 160 from the traffic, protect critical information from leaking out, and prevent damage to the host system 160.

FIG. 1B shows a function block diagram of the network system 100 during operation according to an embodiment of the disclosure. It is noted that the functions can be performed by hardware and/or a combination of hardware and software. The host system 160 runs a host operating system 165. The host operating system 165 includes a host network stack 166 and a host driver 167. The host driver 167 handles operations of the host interface 163, such as receiving operations, transmitting operations, acknowledgement operations, and the like. The host network stack 166 processes received traffic and traffic for transmission according to network stack architecture. It is noted that the host network stack 166 can include security features that rely on the host operating system 165. In an embodiment, the host network stack 166 includes a firewall (not shown) referred to as an in-band firewall that monitors and filters the received traffic and the traffic for transmission. The in-band firewall relies on the host operating system 165.

The security interface system 110 includes a first driver 115, a second driver 116, and an interface network stack 117. The first driver 115 handles operations of the first interface 113, such as receiving operations, transmitting operations, acknowledgement operations, and the like. The second driver 116 handles operations of the second interface 114, such as receiving operation, transmitting operations, and the like. The interface network stack 117 processes traffic passing the security interface system 110 according to network stack architecture. According to an aspect of the disclosure, the interface network stack 117 includes a firewall 118 and an intrusion detection module 119. The firewall 118 is referred to as out-of-band firewall. The firewall 118 and the intrusion detection module 119 can include any suitable security features, such as monitoring the traffic passing the security interface system 110, filtering the traffic, detecting intrusion based on the traffic, and the like. It is noted that the firewall 118 and the intrusion detection module 119 do not rely on the host operating system 165. Thus, an attack that tries to attack the host system 160 based on security flaws in the host operating system 165 cannot disable security features of the firewall 118 and the intrusion detection module 119.

During operation, in an example, the second driver 116 receives traffic coming to the electronic device 103 from the network 101. In an example, the electronic device 103 is a destination of the traffic. The second driver 116 provides the received traffic to the interface network stack 117. The interface network stack 117 processes the received traffic according to network stack architecture, and security features in the interface network stack 117. For example, the firewall 118 blocks traffic with suspicious contents, traffic from suspicious sources, and the like. The intrusion detection module 119 detects possible intrusions based on the traffic. In addition, in an example, the interface network stack 117 includes cryptographic functions that can be suitably performed on the traffic. When the received traffic is considered as safe, the first driver 115 transmits the received traffic to the host system 160; otherwise, the received traffic is blocked from going into the host system 160.

In another example, the first driver 115 receives outgoing traffic from the host system 160, and provides the outgoing traffic to the interface network stack 117. The interface network stack 117 processes the outgoing traffic according to network stack architecture and the security features in the interface network stack 117. For example, the interface stack 117 determines whether the outgoing traffic contains sensitive information, and adds protections, such as encryption, and the like, to sensitive information, for example. Then, the second driver 116 transmits the protected outgoing traffic, or non-sensitive outgoing traffic to the network 101.

Figure 2:
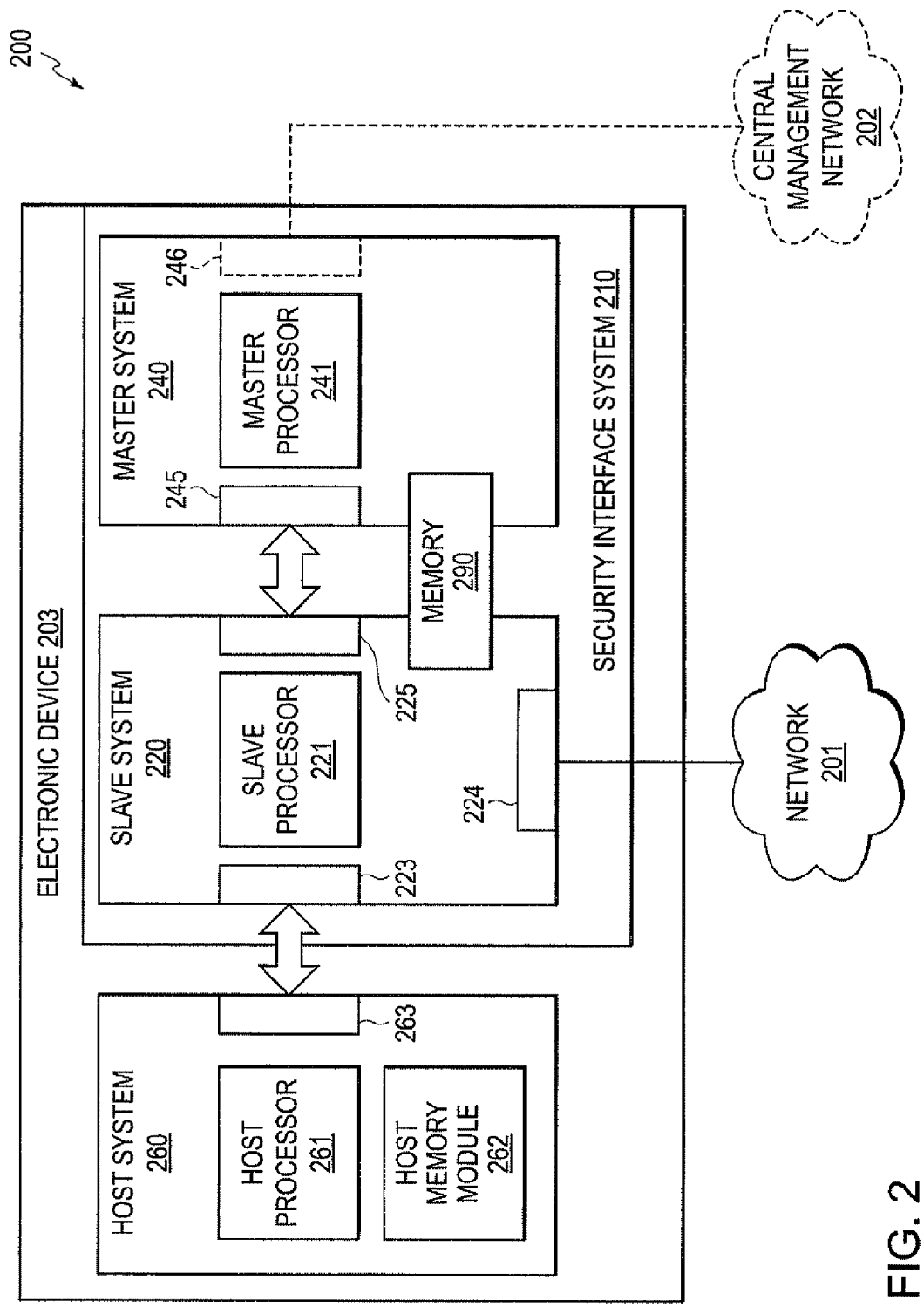
FIG. 2 shows a block diagram of a network system example 200 according to an embodiment of the disclosure.

FIG. 2 shows a block diagram of another network system example 200 according to an embodiment of the disclosure. The network system 200 includes certain components that are identical or equivalent to those in the network system 100; the description of these components has been provided above and will be omitted here for clarity purposes. However, the security interface system 210 includes multiple systems, such as a slave system 220 and a master system 240 coupled together as shown in FIG. 2.

In the FIG. 2 example, the slave system 220 includes a slave processor 221, a first interface 223 for communication with the host system 260, a second interface 224 for communication with the network 201 and a third interface 225 for communication with the master system 240. The master system 240 includes a master processor 241, and a master interface 245 for communication with the slave system 220. According to an embodiment of the disclosure, the slave system 220 and master system 240 share a memory module 290. It is noted that the salve system 220 and the master system 240 can also include respective memory modules (not shown) that are not shared with each other.

According to an aspect of the disclosure, the master system 240 can communication with another network, such as a central management network 202, via a management interface 246, for example. In an example, the electronic device 203 is in a local area network (LAN). The LAN is configured to have a first virtual LAN (VLAN) that is coupled to Internet, such as the network 201 shown in FIG. 2, and a second VLAN that manages the LAN, such as the central management network 202 shown in FIG. 2. The master system 240 can receive information, such as control information and the like, from the central management network 202, and can send information, such as snapshots of system files and system memory, event loggings and the like, to the central management network 202.

According to an embodiment of the disclosure, the security interface system 210 can be configured into multiple security levels. In an embodiment, the central management network 202 controls the configuration of the security interface system 210. For example, during operation, the master system 240 receives control information from the central management network 202, and configures the security interface system 210 into a security level according to the control information. It is noted that the control information can be stored in a non-volatile memory, such that the security interface system 210 can be configured in the same security level with each reboot, for example.

In another embodiment, a user can manually control the configuration of the security interface system 210. In an example, the master system 240 receives control information from a user input device, and configures the security interface system 210 into a security level according to the control information. The control information can be stored in a non-volatile memory, such that the security interface system 210 can be configured in the same security level with each reboot, for example.

It is noted that, in an example, the security level can be modified during the operation of the security interface system 210, for example, triggered by receiving control information from the central management network 202 or the user input device during operation. In another example, the security level cannot be modified after an initial installation of the security interface system 210 in the electronic device 203.

According to an embodiment of the disclosure, the security levels include a traffic monitoring level, a system monitoring and control level, and a self-heal level.

The traffic monitoring level is a basic level. At the traffic monitoring level, the slave system 220 is configured similarly to the security interface system 110 shown in FIGS. 1A and 1B to provide security service to the traffic between the host system 260 and the network 201. Specifically, the slave system 220 monitors the traffic between the host system 260 and the network 201, filters the traffic, and detects intrusion based on the traffic.

Additionally, the master system 240 controls the slave system 220, monitors the slave system 220, and logs monitored events happened in the slave system 220. It is noted that the event loggings can be stored in the security interface system 210 or can be transmitted to the central management network 202, for example.

In an example, the master interface 245 and the third interface 225 are coupled together to form a communication channel. The master system 240 sends control information and status requests to the slave system 220 via the communication channel, and the slave system 220 reports the status to the master system 240 via the communication channel.

In another example, the master system 240 and the slave system 220 are configured to have different access configuration to the memory 290. For example, the memory 290 has a first portion allocated for use by the slave system 220 and a second portion allocated for use by the master system 240. The slave system 220 is configured to have read and write access to the first portion, but not the second portion. The master system 240 is configured to have read and write access to the second portion and the first portion. Thus, the master system 240 can monitor the slave system 220 by monitoring the first portion of the memory 290, and the slave system 220 is not aware of being monitored. In addition, the master system 240 can modify the first portion of the memory 290 to control the operations of the slave system 220.

Due to the reason that the security operations of the slave system 220 are controlled by the master system 240 and the master system 240 is isolated from the network 201 and host system 260, an attacker cannot disable the security operations. In another example, the master system 240 can reconfigure the slave system 220 if an attacker has corrupted the slave system 220.

At the system monitoring and control level, in addition to the functions performed at the traffic monitoring level, the slave system 220 monitors the host system. For example, the slave system 220 dynamically looks at system memory, system files, and the operation system kernel of the host system 260 to determine rogue and anomalous events. Because the slave system 220 does not rely on the host operating system 260, an attacker cannot disable the system monitoring function by corrupting the host operating system 260 to avoid detection.

In an example, the slave system 220 is triggered by events or timers to take snapshots of a critical file or a memory portion of the host system 260. The snapshots can be stored in the slave system 220 or can be transmitted to the central management network 202 for file corruption detection and/or memory corruption detection. In an example, the slave system 220 includes a non-volatile memory storing a reference copy of the critical file of the host system 260. Then, the slave system 220 compares the snapshots with the reference copy to detect rogue and anomalous events. Further, when the slave system 220 detects a corrupted section of the critical file, the slave system 220 can store the corrupted section to a specific storage device for further investigation to determine a root cause.

In another example, the master system 240 sends the snapshots to the central management network 202. The central management network 202 has a reference copy of the critical file. A device in the central management network 202 compares the reference copy with the snapshots to detect rogue and anomalous events.

In addition to the monitoring features at the system monitoring and control level, the slave system 220 has the capability to allow/deny control access and use to resources and objects of the host system 260. In an example, the slave system 220 can enforce the security policy of the host system 260 by allowing or denying access to applications and files of the host system 260.

At the self-heal level, in addition to the functions performed at the traffic monitoring level and the system monitoring and control level, the security interface system 210 provides a self-heal function and a trusted boot function. In an example, the slave system 220 keeps an original copy or a last-known good copy of critical system files. When the security interface system 210 detects that a critical file is changed by an unapproved method, the security interface system 210 restores the critical file back to the original or the last-known good state.

In another example, the slave system 220 or the master system 240 keeps a trusted copy of system BIOS and operating system (OS) image of the host system 260. When the system BIOS and/or OS in the host system 260 is changed by unapproved method, the slave system 220 restores the system BIOS and the OS of the host system using the trusted copy. In addition, in another example, every time when the host system 260 boots up, the slave system 220 can send the trusted copy of the system BIOS and OS image into the host system 260 to ensure the host system 260 boots up from the trusted system BIOS and OS.

It is noted that the security interface system 210 can be implemented by any suitable techniques. In an embodiment, the security interface system 210 is implemented using one or more integrated circuit chips. The integrated circuit chips can be custom designed to include suitable components to enable the functions of the security interface system 210, or can be programmable chips that are suitably programmed to enable the functions of the security interface system 210. In an example, the slave processor 221 and the master processor 241 are implemented on a single chip. The chip is suitably coupled to other chips, such as a DRAM chip, a flash memory chip, and the like. In another example, the slave processor 221 and the master processor 241 are implemented on separate chips. The two separate chips are suitably coupled together.

Figure 3:
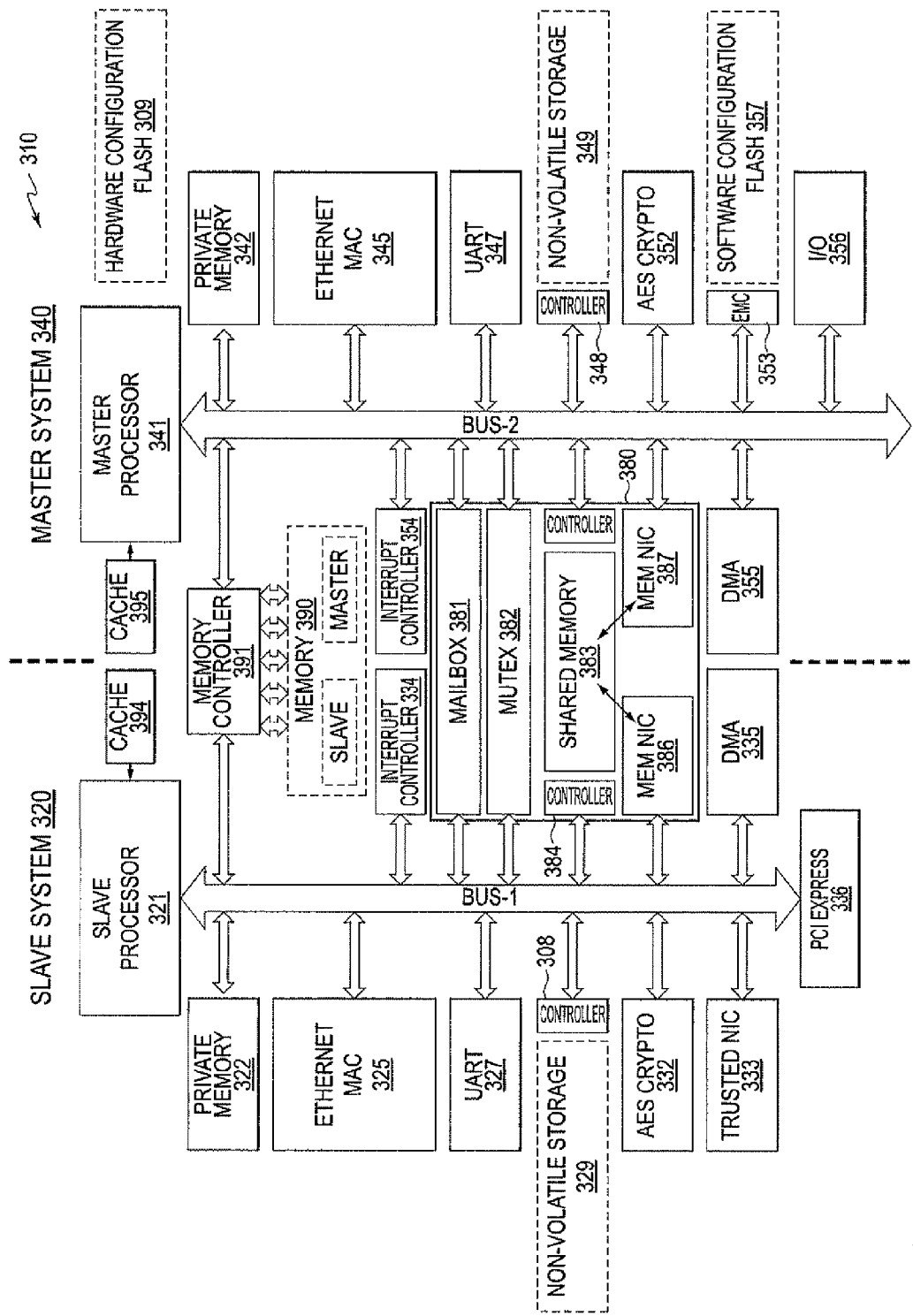
FIG. 3 shows a block diagram of a security interface system example 310 according to an embodiment of the disclosure.

FIG. 3 shows a block diagram of a security interface system 310 according to an embodiment of the disclosure. The security interface system 310 can be used in the place of the security interface system 210 in the FIG. 2. The security interface system 310 is implemented using a field programmable gate array (FPGA) chip, and memory chips. For example, components in the dashed boxes are implemented using separate memory chips or memory chip sets, and the rest of the components are implemented using an FPGA chip. It is noted that the components on the FPGA chip can be suitably implemented using hard intellectual property (IP) cores, soft IP, and specifically designed IP for the security interface system 310.

The security interface system 310 includes a slave system 320 and a master system 340. The slave system 320 includes a slave processor 321, a slave bus BUS-1, and components coupled to the slave bus BUS-1. The master system 340 includes a master processor 341, a master bus BUS-2 and components coupled to the master bus BUS-2. It is noted that some components are only coupled to the slave bus BUS-1, some components are only coupled to the master bus BUS-2, and some components are coupled to both the slave bus BUS-1 and the master bus BUS-2.

Specifically, the slave system 320 includes its own memories, such as cache 394, private memory 322, and non-volatile storage 329. Those memory modules include suitable controllers and are suitably configured for various purposes. For example, the cache 394 is configured to have relatively fast access speed, the non-volatile storage 329 is configured to have a relatively large storage space, and the private memory 322 is configured for private use of the slave system 320. The non-volatile storage 329 can be used as a file system for the slave system 320. For example, the non-volatile storage 329 can store a reference copy of critical files, such as system kernel, and the like of the host system 260, a snapshot of the critical files of the host system 260, and a trusted copy of system BIOS for the host system 260.

Further, the slave system 320 includes various interfaces to support communication with, for example, the host system 260, and the network 201. For example, the slave system 320 includes an Ethernet media access controller (MAC) 325 configured to support an Ethernet connection of the slave system 320 with the network 201, for example. The slave system 320 also includes universal asynchronous receiver/transmitter (DART) 327 configured to enable serial port communication that may be needed by the slave system 320. Further, the slave system 320 includes peripheral component interconnect express (PCI express) module 336 that is suitably configured to support connection with the host system 260, for example.

Additionally, the slave system 320 includes components that support the various functions of the slave system 320. For example, the slave system 320 includes a crypto module, such as AES crypto module 332, that can employ a wide variety cryptograph functions for the slave system 320 and can also be exposed to the host system 260 for cryptographic acceleration. In another example, the slave system 320 includes trusted network interface card (NIC) module 333 that can perform, for example, the firewall and the intrusion detection functions on the traffic passing the slave system 320.

It is noted that the slave system 320 can include other components that are necessary for supporting the operations of the slave system 320. For example, the slave system 320 includes an interrupt controller 334 to handle interrupts that are generated by the components of the slave system 320 to require the slave processor 321. In another example, the slave system 320 includes a direct memory access (DMA) 335 to offload the slave processor 321 from processing memory access.

The master system 340 utilizes certain components that are identical or equivalent to those used in the slave system 320, such as cache 395, private memory 342, Ethernet MAC 345, UART 347, AES crypto 352, DMA 355, and interrupt controller 354; the description of these components has been provided above and will be omitted here for clarity purposes.

The Ethernet MAC 345 are configured to support an Ethernet connection of the master system 340 with the central management network 202, for example.

The master system 340 includes flash memories configured to suit various purposes. For example, the master system 340 includes software configuration flash memory 357 coupled to the master bus BUS-2 via external memory control (EMC) 353. The software configuration flash memory 357 has relatively fast speed, and is configured to store, for example, operating system and kernels for the master system 340 and the slave system 320. Further, the master system 340 includes non-volatile storage 349 coupled to the master BUS-2. The non-volatile storage 349 has a relatively large storage space, and is configured to suit a file system for the master system 340.

The master system 340 also has input/output (I/O) interfaces 356 to enable user control and monitor. For example, the I/O interfaces 356 include an interface to light emitting diode (LED) indicators for status indication. Further, the I/O interfaces 356 include an interface to switches or push buttons for user control.

Additionally, the slave system 320 and the master system 340 have shared components. For example, the slave system 320 and the master system 340 shares memory controller 391 for accessing memory 390. In an example, the memory 390 is a double data rate (DDR) memory set that is shared by the slave system 320 and the master system 340 as their system memory. For example, the memory 390 has a first portion allocated to the slave system 320 as the slave system memory, and a second portion allocated to the master system 340 as the master system memory. During operation, the slave system 320 accesses the first portion of the memory 390 via the memory controller 391, and the master system 340 accesses the second portion of the memory 390 via the memory controller 391. Additionally, the master system 340 can access the first portion of the memory 390. In an example, the master system 340 reads the first portion to monitor the slave system 320 to detect any rogue and anomalous events happened in the slave system 320. It is noted that when the master system 340 monitors the slave system 320 via the memory controller 391, the slave system 320 does not need to respond, thus, the operations of the slave system 320 are not disturbed, and the slave system 320 is not aware of being monitored.

In another example, the master system 340 can write to the first portion of the memory 390 via the memory controller 391. For example, the master system 340 writes system files of the slave system 320 from a trusted copy to the first portion of the memory 390 at a boot-up time of the slave system 320.

However, in an example, the slave system 320 cannot access the second portion of the memory 390 via the memory controller 391. Thus, in the example, even if the slave system 320 is compromised to an attacker, the master system 340 will stay safe and can restore the slave system 320.

Additionally, the slave system 320 and the master system 340 shares a communication channel module 380 that is coupled to both the slave bus BUS-1 and the master bus BUS-2 to support communication between the slave system 320 and the master system 340. The communication channel module 380 can include various components that enable inter-processor communication. According to an embodiment of the disclosure, the communication channel 380 includes a mailbox 381, a mutex 382, a shared memory 383, a slave memory interface (MEM NIC) 386, and a master memory interface (MEM NIC) 387.

The mailbox 381 and the mutex 382 are configured to perform handshakes between the slave system 320 and the master system 340. For example, the mailbox 381 is configured to send data and generate interrupts between the slave system 320 and the master system 340. The mutex 382 is configured to provide a mechanism for mutual exclusion to enable one system to gain exclusive access to the shared memory 383.

The slave MEM NIC 386 and the master MEM NIC 387 are network interfaces for the slave system 320 and the master system 340 that use memory interfaces to access the shared memory 383 for communication.

During operation, for example, the master system 340 needs to send information, such as control information, to the slave system 320. The master system 340 sends a message to the mailbox 381 to inform the slave system 320 and the communication channel 380. Then, the mutex 382 allows the master system 340 to have exclusive access to the shared memory 383. The master MEM NIC 387 writes the control information into the shared memory 383. Then, the mutex 383 allows the slave system 320 to have exclusive access to the shared memory 383. The slave MEM NIC 386 reads the control information into the slave system 320.

In another example, when the slave system 320 needs to report status to the master system 340, the slave system 320 first sends a message to the mailbox 381 to inform the master system 340 and the communication channel 380. Then, the mutex 387 allows the slave system 320 to have exclusive access to the shared memory 383. The slave MEM NIC 386 writes the status information into the shared memory 383. Then, the mutex 387 allows the master system 340 to have exclusive access to the shared memory 383. The master MEM NIC 387 reads the status information into the master system 340.

It is noted that the security interface system 310 includes other components, such as the hardware configuration flash memory 309 and the like. The hardware configuration flash memory 309 is configured to store configurations for programming FPGA of the FPGA chip into suitable components of the security interface system 310.

During a boot-up operation, for example, the configurations in the hardware configuration flash memory 309 are used to suitably program the FPGA of the FPGA chip into suitable components of the security interface system 310. The master system 340 loads the operating system from the software configuration flash memory 357. In an embodiment, the master system 340 retrieves an operating system for the slave system 320 from its memory, and loads into the slave system 320 via the memory controller 391 and the memory 390.

Further, the master system 340 includes security control information for the security interface system 310. The security control information can be stored in a flash memory attached to the master system 340, or can be received from the central management network 202, or can be input to the master system 340 via a user input device. Based on the security control information, the master system 340 controls the slave system 320 and configures the security interface system 310 into a security level, such as the traffic monitoring level, the system monitoring and control level, the self-heal level, and the like.

Figure 4:
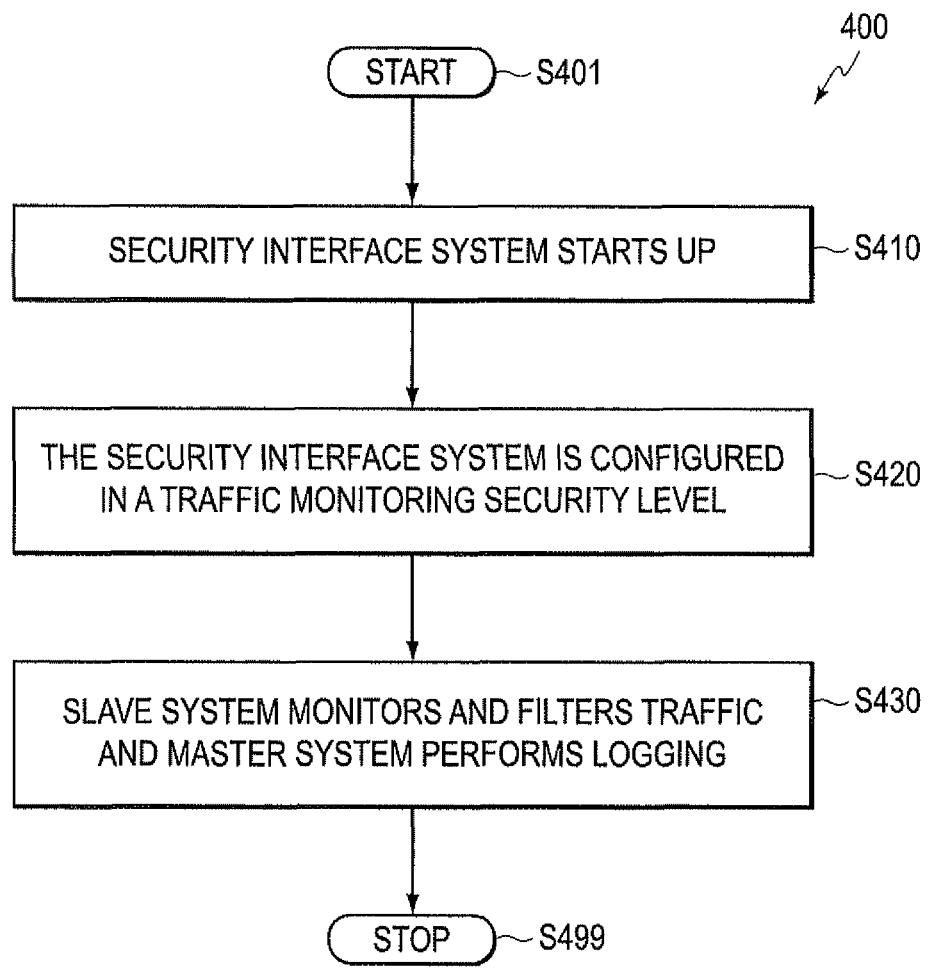
FIG. 4 shows a flow chart outlining a process example 400 according to an embodiment of the disclosure.

FIG. 4 shows a flow chart outlining a process example 400 of the security interface system 210 according to an embodiment of the disclosure. The process starts at S401 and proceeds to S410.

At S410, the security interface system 210 starts up. In an example, the security interface system 210 is implemented using an FPGA chip and memory chips, such as implemented as the security interface system 310. For example, the hardware configuration flash memory 309 stores the circuit configurations for configuring the FPGA chip into the security interface system 210. When the FPGA chip is powered up, the FPGA chip is suitably configured according to the circuit configurations.

At S420, the security interface system 210 is configured into a traffic monitoring security level.

At S430, at the traffic monitoring security level, the slave system 220 monitors and filters the traffic between the host system 260 and the network 201 and the master system 240 monitors the slave system 220 and performs event loggings. Then, the process proceeds to S499 and terminates.

It is noted that the process 400 can be suitably modified. For example, during operation, the security interface system 210 receives control information to configure the security interface system 210 into the traffic monitoring security level, and then the process can start from S420.

Figure 5:
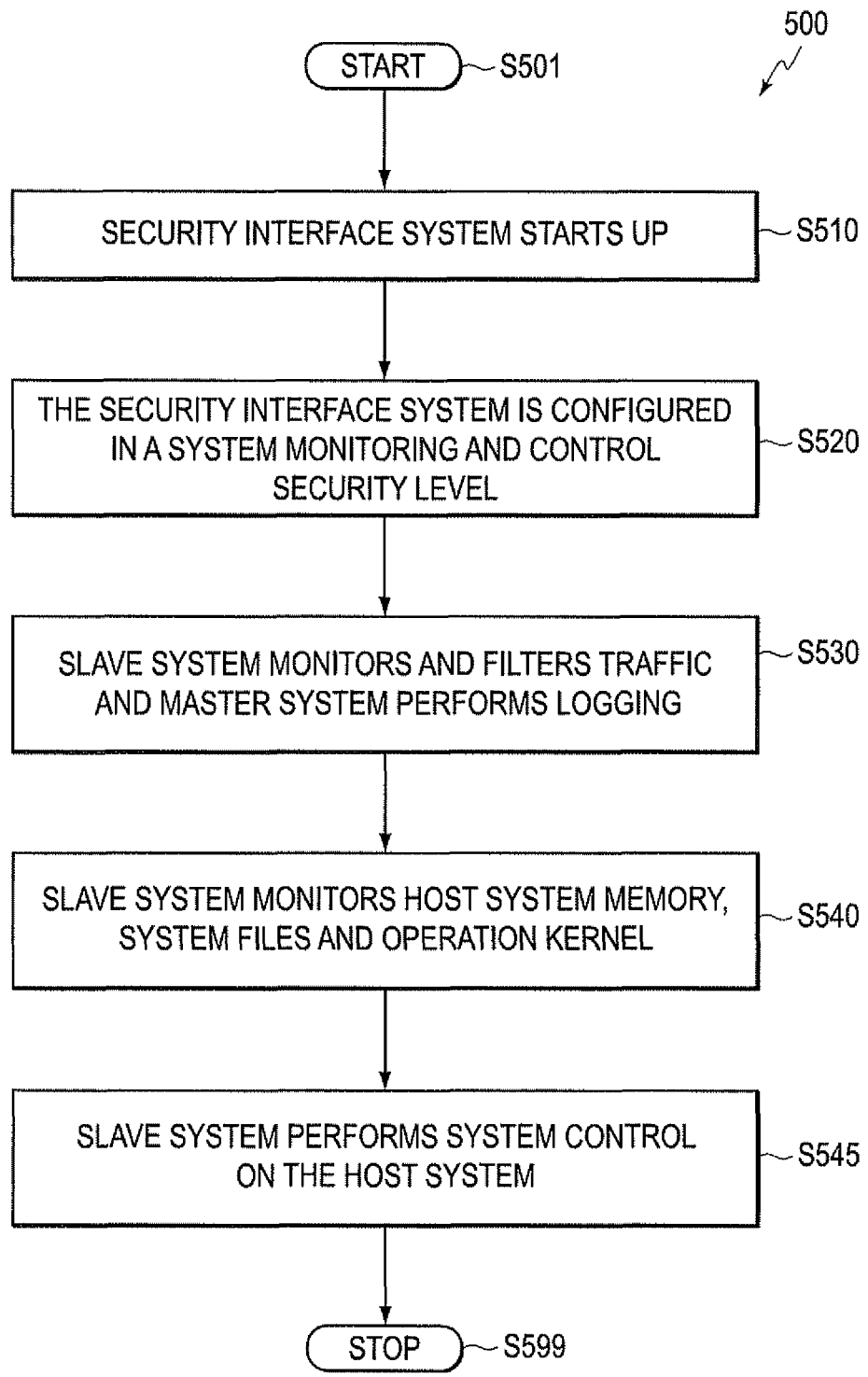
FIG. 5 shows a flow chart outlining a process example 500 according to an embodiment of the disclosure.

FIG. 5 shows a flow chart outlining a process example 500 of the security interface system 210 according to an embodiment of the disclosure. The process starts at S501 and proceeds to S510.

At S510, the security interface system 210 starts up. In an example, the security interface system 210 is implemented using an FPGA chip and memory chips, such as implemented as the security interface system 310. For example, the hardware configuration flash memory 309 stores the circuit configurations for configuring the FPGA chip into the security interface system 210. When the FPGA chip is powered up, the FPGA chip is suitably configured according to the circuit configurations.

At S520, the security interface system 210 is configured into a system monitoring and control security level.

At S530, at the system monitoring and control security level, the security interface system 210 performs basic functions as the traffic monitoring security level. Specifically, the slave system 220 monitors and filters the traffic between the host system 260 and the network 201 and the master system 240 monitors the slave system 220 and performs event loggings.

At S540, in addition to the basic functions, the slave system 220 monitors system memory, system files, and operating system kernel of the host system 260. In an example, the slave system 220 takes snapshot of a file in the host system 260, and stores the snapshot for later analysis. In another example, the slave system 220 includes a reference copy of the file, and compares the reference copy with the snap copy to detect file corruptions.

At S545, the slave system 220 also performs system control on the host system 260. For example, the slave system 220 is configured to have the capability to allow/deny control access and use to resources and objects of the host system 260. In an example, the slave system 220 can enforce the security policy of the host system 260 by allowing or denying access to applications and files of the host system 260. Then the process proceeds to S599 and terminates.

It is noted that the process 500 can be suitably modified. For example, during operation, the security interface system 210 receives control information to configure the security interface system 210 into the system monitoring and control security level, and then the process can start from S520. In addition, S530, S540 and S545 can be executed in parallel, or in difference sequence, or in asynchronous mode.

FIG. 6 shows a flow chart outlining a process example 600 of the security interface system 210 according to an embodiment of the disclosure. The process starts at S601 and proceeds to S610.

At S610, the security interface system 210 starts up. In an example, the security interface system 210 is implemented on an FPGA chip, such as implemented as the security interface system 310. The FPGA chip includes a platform flash stores the circuit configurations for configuring the FPGA chip into the security interface system 210. When the FPGA chip is powered up, the FPGA chip is suitably configured according to the circuit configurations.

At S620, the security interface system 210 is configured into a self-heal security level.

At S625, the slave system 220 provides a copy of the trusted BIOS and OS to the host system 260 to boot-up the host system 260 from the trusted BIOS and OS.

At S630, at the self-heal security level, the security interface system 210 also performs basic functions of the traffic monitoring security level. Specifically, the slave system 220 monitors and filters the traffic between the host system 260 and the network 201 and the master system 240 monitors the slave system 220 and performs event loggings.

At S640, in addition to the basic functions, the security interface system 210 also performs the functions of the system monitoring and control level. Specifically, the slave system 220 monitors system memory, system files, and operating system kernel of the host system 260. In an example, the slave system 220 takes snapshot of a file in the host system 260, and stores the snapshot for later analysis. In another example, the slave system 220 includes a reference copy of the file, and compares the reference copy with the snap copy to detect file corruptions.

At S645, the slave system 220 also performs system control on the host system 260. For example, the slave system 220 is configured to have the capability to allow/deny control access and use to resources and objects of the host system 260. In an example, the slave system 220 can enforce the security policy of the host system 260 by allowing or denying access to applications and files of the host system 260.

At S650, in addition to the traffic monitoring function and the system monitoring and control function, the security interface system 210 provides self-healing functions when the host system 260 has corrupted file or memory. Specifically, the slave system 220 includes a trusted copy of system files, or a last-known good copy of the system files for the host system 260. When a file of the host system 260 is detected as corrupted, the slave system 220 restores the file based on the trusted copy or the last-known good copy. Then, the process proceeds to S699 and terminates.

It is noted that the process 600 can be suitably modified. For example, during operation, the security interface system 210 receives control information to configure the security interface system 210 into the self-heal security level, and then the process can start from S620. In addition, S630, S640 and S645 can be executed in parallel, or in difference sequence, or in asynchronous mode, for example.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A network interface device for use in an electronic device, comprising:
    a first system that includes:
        a first interface configured to couple the first system with a host system of the electronic device;
        a second interface configured to couple the first system with an external electronic device; and
        first integrated circuits configured to monitor and filter traffic flowing between the external electronic device and the host system of the electronic device without relying on an operating system of the host system,
    a second system having second integrated circuits,
    a communication channel between the first system and the second system, the communication channel including a first shared memory configured to be accessible by both the first system and the second system, and
    a second shared memory configured to have a first portion configured to be accessible by both the first system and the second system, and a second portion configured to be accessible by the second system and to not be accessible by the first system, wherein
    the second system is configured to send control information to the first system to control the first system, and receive status information from the first system via the communication channel,
    the traffic, flowing between the external electronic device and the host system and monitored by the first system, is isolated from the second system,
    the second system is configured to monitor the first portion of the second shared memory that is used by the first system, and
    the communication channel is configured to provide mutual exclusion to enable only one system of the first system and the second system access to a same region of the first shared memory at a time.

2. The network interface device of claim 1, wherein the first system further comprises a first memory configured to store a snapshot copy of at least one of a file and a memory portion in the host system.

3. The network interface device of claim 2, wherein
    the first memory is configured to store a reference copy of the file or the memory portion in the host system; and
    the first integrated circuits are configured to compare the snapshot copy with the reference copy to detect file corruption or memory corruption in the host system.

4. The network interface device of claim 2, wherein
    the first memory is configured to store a copy of at least one of system basic input output system (BIOS) and operating system (OS) for the host system; and
    the first integrated circuits are configured to send the copy of system BIOS and/or the OS to the host system when the host system boots up.

5. The network interface device of claim 1, wherein the second system comprises at least one of a network interface and a user input/output (I/O) interface, other than the communication channel, for receiving the control information.

6. The network interface device of claim 1, wherein the second system comprises a second memory configured to store a copy of system files for the first system, and the second system is configured to send the copy of system files to the first system by writing to the first portion of the shared memory.

7. The network interface device of claim 1, wherein the first integrated circuits comprises:
    a crypto module configured to perform cryptographic operations on the traffic between the host system and the external electronic device.

8. The network interface device of claim 1, wherein the first integrated circuits comprises:
    a firewall module configured to filter the traffic between the host system and the external electronic device; and
    an intrusion detection module configured to detect intrusion based on the traffic between the host system and the external electronic device.

9. The network interface device of claim 1, wherein the first integrated circuits are configured to control resource and object access of the host system.

10. The network interface device of claim 1, wherein
    the network interface device, including the first system and the second system, is disposed in the electronic device, and
    the host system is disposed in the electronic device.

11. A method for security networking in an electronic device, comprising:
    receiving incoming traffic from an external electronic device at a first system of a network interface device in the electronic device;
    monitoring and filtering the incoming traffic by the first system without relying on an operating system of a host system;
    forwarding the filtered incoming traffic from the first system to the host system of the electronic device;
    sending control information from a second system of the network interface device to the first system through a communication channel to control the first system, the communication channel including an first shared memory configured to be accessible by both the first system and the second system;
    providing mutual exclusion to enable only one system of the first system and the second system access to a same region of the first shared memory at a time; and
    monitoring, by the second system, a first portion of a second shared memory that is used by the first system, the second shared memory having the first portion which is configured to be accessible by both the first system and the second system, and a second portion which is configured to be accessible by the second system and to not be accessible by the first system,
    wherein the incoming traffic, received from the external electronic device at the first system and monitored by the first system, is isolated from the second system.

12. The method of claim 11, further comprising:
    receiving by the first system outgoing traffic from the host system;
    monitoring and filtering the outgoing traffic by the first system; and
    forwarding the filtered outgoing traffic to the external electronic device from the first system.

13. The method of claim 11, further comprising:
    taking a snapshot of a least one of a file and a memory portion of the host system; and
    storing the snapshot in the first system.

14. The method of claim 13, further comprising:
    storing a reference copy of the file or the memory portion; and
    comparing the reference copy with the stored snapshot to detect a file corruption or a memory corruption in the host system.

15. The method of claim 11, further comprising:
    storing in the first system a copy of at least one of system basic input output system (BIOS) and operating system (OS) for the host system; and
    sending the copy of system BIOS and/or OS to the host system when the host system boots up.

16. The method of claim 11, further comprising:
    monitoring and logging operations of the first system by the second system.

17. The method of claim 16, further comprising:
monitoring memory of the first system by the second system.

18. The method of claim 16, further comprising at least one of:
storing the control information in the second system;
receiving the control information from a network interface of the second system other than the communication channel; and
receiving the control information from a user input/output interface of the second system other than the communication channel.

19. The method of claim 16, further comprising:
storing in a memory of the second system files of the first system; and
providing the system files from the second system to the first system.

20. The method of claim 16, further comprising:
communicating by the second system with an external control device to receive the control information.

21. The method of claim 11, further comprising:
controlling by the first system resource and object access of the host system.

\* \* \* \* \*